(No Model.)
F. SANDERSON.
FLOUR BIN.
No. 399,785. Patented Mar. 19, 1889.
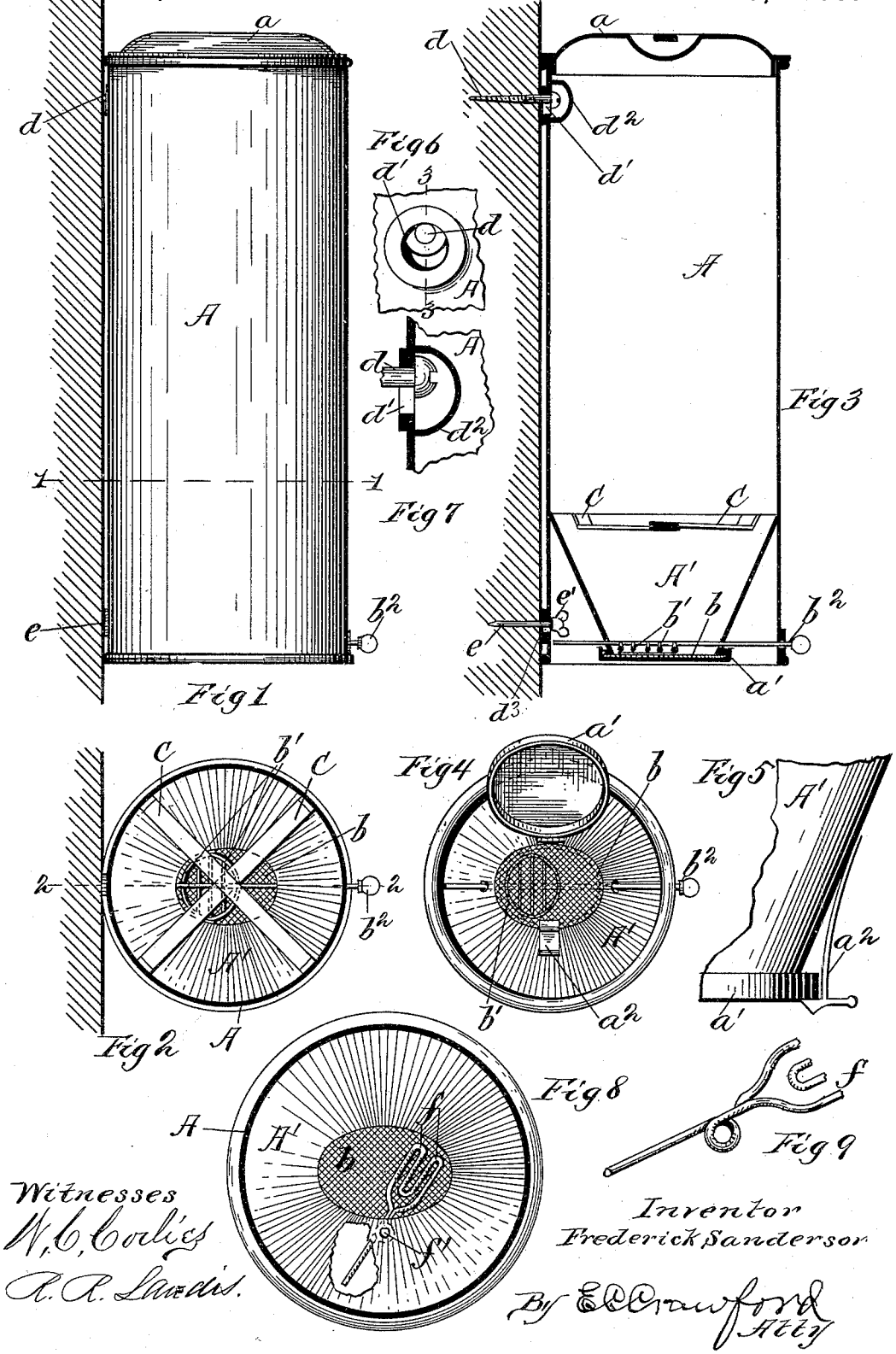
Witnesses
W. C. Colles
A. A. Landis.
Inventor
Frederick Sanderson
By E. C. Crawford
Atty

UNITED STATES PATENT OFFICE.

FREDERICK SANDERSON, OF PROSPECT PARK, ILLINOIS.

FLOUR-BIN.

SPECIFICATION forming part of Letters Patent No. 399,785, dated March 19, 1889.

Application filed October 6, 1888. Serial No. 287,403. (No model.)

*To all whom it may concern:*

Be it known that I, FREDERICK SANDERSON, of Prospect Park, county of Du Page, and State of Illinois, have invented an Improvement in a Combined Flour-Bin and Sifter, of which the following description, in connection with the accompanying drawings, is a specification, like letters on the drawings representing like parts.

The object of my invention is to provide a receptacle for flour, meal, &c., to be used in dwelling-houses, &c.

Figure 1 is a side elevation of my improved flour-bin. Fig. 2 is a plan section of the same taken on line 1 1 of Fig. 1. Fig. 3 is a vertical longitudinal section taken on the line 2 2 of Fig. 2. Fig. 4 is an inverted plan view of the bottom with the hinged disk thrown open, showing the sieve. Fig. 5 is a detail side elevation of the spring-catch for the disk. Fig. 6 is an elevation of the upper socket for the reception of the round-headed screw. Fig. 7 is a detail section of the same taken on the line 3 3 of Fig. 6. Fig. 8 is a plan section similar to Fig. 2, showing a modification of the vibrator; and Fig. 9 is a detail perspective of the handle portion of the modification.

A is the body of the bin, which is preferably cylindrical in form.

A' is a receptacle in the lower part of the bin, which is elliptical in its transverse section, and the sides of which converge toward the bottom of the bin. These two parts may be either soldered together, or the former may be provided with a ledge or lugs extending from its inner surface, and the latter with a flange extending outward from its upper edge, so as to rest upon such legs or lugs.

When ready for use, the lower edges of the body of the bin will extend somewhat below the bottom of the elliptical receptacle.

$a$ is a cover for the bin.

$b$ is a sieve, elliptical in form, secured to the lower edge of said receptacle.

$a'$ is a disk hinged or fastened in any other suitable manner upon the lower edge of the converging part to keep dust out and flour in when the vibrator is not in operation.

$a^2$ is a spring secured to the latter and designed to secure the disk in position when shut upon the mouth of the converging part.

$b'$ is a vibrator. This is a circular piece of open-work, which may be made of either metal or wood. It lies on the sieve, has a diameter nearly equal to the shorter axis of the same, and is provided with a handle, $b^2$, extending beyond the bin, by which it can be moved back and forth on the sieve. It is obvious that by such movement the flour in the bin will be disturbed and will drop through the sieve. The disk having been removed, the flour can be caught in any desired receptacle.

C C are cross-pieces secured in the body of the bin near the bottom to sustain a part of the weight of the flour and thus relieve the sieve of some of the pressure that it would otherwise have to sustain, and thus facilitate its working. These should be broad enough and of sufficient number to accomplish the desired effect.

The bin is supported by a round-headed screw, $d$, inserted in the wall or other support, and a screw-threaded nail, $e$, inserted in like manner. For the reception of the head of the former the bin is provided near its top with a hole, $d'$, covered by the cap $d^2$. The latter nail passes through a hole, $d^3$, near the bottom of the body of the bin in the same vertical line with the hole $d'$, and is secured by the thumb-piece $e'$, which, being tightened, will press the bin against its support and thus equalize the weight between the two fastenings. By this method of sustaining the bin it is brought so near the points of support of the pins that it exerts the minimum strain upon them.

A piece of strap-iron is soldered to the outside of the bin at or near the point where the nail $e$ passes through the same. It is placed at right angles to the length of the bin, is made of such thickness that its outer surface will be flush with the outer edge of the rim of the bin, and is secured to the bin so that it will present a plane face to the wall or other support. It is obvious that the latter effect may be secured by bending the ends inward to meet the bin for the purpose of being soldered. This iron may be pierced with a hole for the passage of the nail $e$, or it may be placed against the bin just above or just below the nail. The sides of the cylinder are continued below the cone, so as to furnish a support for the combination in order that it may be set on the floor to be filled.

Figs. 8 and 9 illustrate a modification in the form and method of using the vibrator. Such modification is made of one continuous wire, $f$, and is operated by a lever movement on the fulcrum-pin $f'$, secured to the elliptical receptacle.

Having fully described my invention, what I claim as new, and desire to secure by Letters Patent of the United States, is—

1. The combination of a cylindrical bin, a hollow truncated cone secured within the bin near its base, a sieve secured horizontally in the bottom of the cone, an open-work vibrator placed on the sieve having a handle extending beyond the bin, cross-pieces secured within the bin a short distance above the cone, a round-headed screw and a screw-threaded nail having a thumb-piece passing through a side of the cylinder, respectively near its upper and lower ends, and a section of strap-iron soldered to the outside of the bin near said nail at right angles to the longitudinal axis of the bin and having its outer surface plane, substantially as and for the purposes specified.

2. The combination of a flour-bin, A, formed with the holes $d'$ and $d^3$ in its side in a line parallel with its longitudinal axis, the cap $d^2$, secured to the side of the bin to cover the hole $d'$ and being made with a lateral diameter greater than that of the hole, the round-headed screw $d$, having its head enter said hole, the screw-threaded nail $e$, made with the thumb-piece $e'$ and passing through the hole $d^3$ from within the bin, the hollow truncated cone A', secured in the bin near its lower end, the sieve $b$, secured in the cone at its bottom, and the vibrator $b'$, made with the handle $b^2$ and placed on the sieve, substantially as and for the purposes specified.

FREDERICK SANDERSON.

Witnesses:
W. C. CORLIES,
E. C. CRAWFORD.